United States Patent
Boudet

(10) Patent No.: US 9,354,129 B2
(45) Date of Patent: May 31, 2016

(54) TORQUE METER DEVICE FOR A CYCLE

(71) Applicant: Commissariat à l'énergie atomique et aux énergies alternatives, Paris (FR)

(72) Inventor: Thierry Boudet, Echirolles (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 42 days.

(21) Appl. No.: 14/106,117

(22) Filed: Dec. 13, 2013

(65) Prior Publication Data

US 2014/0171258 A1    Jun. 19, 2014

(30) Foreign Application Priority Data

Dec. 14, 2012   (FR) ...................................... 12 62056
Dec. 13, 2013   (EP) ...................................... 13197178

(51) Int. Cl.
*G01L 3/14*    (2006.01)
*G01L 3/10*    (2006.01)
*B60W 10/08*   (2006.01)

(52) U.S. Cl.
CPC .................. *G01L 3/10* (2013.01); *B60W 10/08* (2013.01); *G01L 3/1478* (2013.01); *B62K 2207/00* (2013.01); *Y10T 477/23* (2015.01)

(58) Field of Classification Search
CPC ..... B62K 2207/00; G01L 3/10; G01L 3/1478
See application file for complete search history.

(56) References Cited

U.S. PATENT DOCUMENTS

| | | | | |
|---|---|---|---|---|
| 4,966,380 | A * | 10/1990 | Mercat | 280/259 |
| 6,889,809 | B2 * | 5/2005 | Yoshiie et al. | 192/46 |
| 7,775,128 | B2 * | 8/2010 | Roessingh et al. | 73/862.191 |
| 8,096,211 | B2 * | 1/2012 | Cho et al. | 81/57.39 |
| 8,336,400 | B2 * | 12/2012 | Lassanske | 73/862.29 |
| 2007/0170688 | A1 * | 7/2007 | Watson | 280/260 |
| 2010/0263468 | A1 * | 10/2010 | Fisher et al. | 74/469 |

* cited by examiner

*Primary Examiner* — Sherry Estremsky
(74) *Attorney, Agent, or Firm* — Kevin R Erdman; Brannon Sowers & Cracraft PC

(57) ABSTRACT

The present invention involves device for measuring the drive torque and/or the driving power delivered on a hub shell by a freewheel body connected to the hub shell by a freewheel mechanism, the device including at least one deformation and/or stress sensor on or integrated to at least one ratchet of said mechanism and a drive torque and/or driving power determination circuit, connected to the sensor.

13 Claims, 3 Drawing Sheets

TORQUE METER DEVICE FOR A CYCLE

CROSS-REFERENCE TO RELATED APPLICATIONS

This application claims the priority benefit of French patent application Ser. No. 12/62056, filed on Dec. 14, 2012, and European Patent Application number, filed on Dec. 13, 2013, both entitled "Dispositif de mesure de couple moteur dans un cycle", the disclosures of which are hereby incorporated by reference in their entirety.

BACKGROUND OF THE INVENTION

1. Field of the Invention

The present disclosure relates to a device for measuring the drive torque and/or the driving power of a cycle wheel, as well as a cycle wheel hub provided with such a device.

2. Description of the Related Art

Measuring the driving power of a bicycle wheel is advantageous in many cases, for example, to evaluate a cyclist's performance during training. Knowing, at any time, the driving power delivered by the cyclist may help cyclists optimize their practice. It especially enables them to better manage their effort and their pedaling motion, during training or in a race.

The driving power delivered by the cyclist may be obtained by multiplying the drive torque, transmitted by the cyclist to the drive wheel, by the angular velocity of this wheel.

Publication WO2011/066075 describes a bicycle rear wheel hub comprising a device measuring the torque exerted on the bicycle drive wheel, the disclosures of which are incorporated by reference herein.

SUMMARY OF THE INVENTION

Thus, a device for measuring the drive torque and/or the driving power delivered on a hub shell by a freewheel body connected to the hub shell by a freewheel mechanism is provided herein, the device comprising at least one deformation and/or strain sensor on, or integrated to, at least one ratchet of said mechanism, and a drive torque and/or driving power determination circuit, connected to the sensor.

According to an embodiment, the sensor comprises at least one resistance strain gauge on said ratchet.

According to an embodiment, at least two deformation and/or strain sensors are arranged on, or integrated to, said ratchet.

According to an embodiment, the sensor comprises at least one microelectromechanical system integrated to the ratchet.

According to an embodiment, the mechanism comprises several ratchets, the device comprising at least one deformation and/or strain sensor on, or integrated to, each ratchet.

According to an embodiment, the device comprises a system of electric power supply of said circuit and/or of said sensor comprising at least a solar panel and a power storage device.

According to an embodiment, the device further comprises a sensor for determining the angular velocity of the hub shell.

According to an embodiment, the device comprises a first drive torque determination circuit and a second driving power determination circuit separate from the first circuit.

According to an embodiment, the first circuit transmits data to the second circuit over a wireless connection.

A cycle hub comprising a freewheel body, a hub shell, a freewheel mechanism with ratchets, and a device, such as defined hereabove, for measuring the drive torque and/or the driving power delivered on the hub shell by the freewheel body, are also provided.

According to an embodiment, the sensor is located in a recess provided at the ratchet surface.

A bicycle provided with a meter device, such as previously defined, is also provided.

A system for controlling a pedal-assist motor in a pedal vehicle is also provided, comprising:
a meter device such as defined hereabove; and
means for increasing the motor power when the power provided by a user decreases and for decreasing it when the power provided by the user increases.

A bicycle equipped with a pedal-assist motor and with a control system of this motor such as previously defined is also provided.

The foregoing and other features and advantages will be discussed in detail in the following non-limiting description of specific embodiments in connection with the accompanying drawings.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Figure 1:
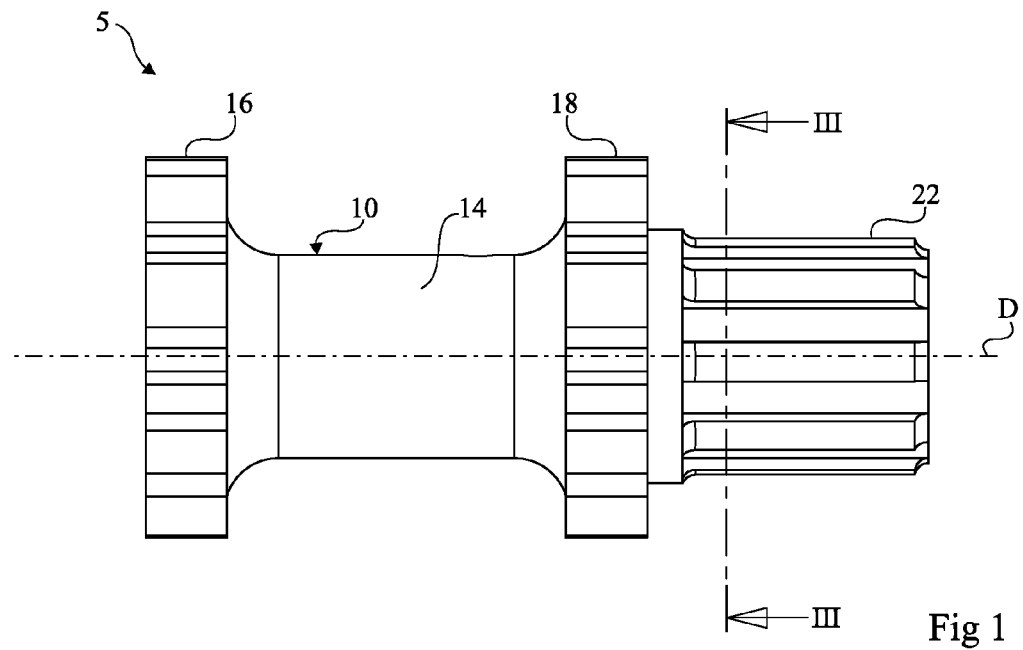
FIG. 1 is a side view of an embodiment of a bicycle drive wheel hub.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates an embodiment of the invention, in one form, and such exemplifications are not to be construed as limiting the scope of the invention in any manner.

DESCRIPTION OF EMBODIMENTS OF THE PRESENT INVENTION

The embodiments disclosed below is/are not intended to be exhaustive or limit the invention to the precise form disclosed in the following detailed description. Rather, the embodiment is chosen and described so that others skilled in the art may utilize its teachings.

For clarity, the same elements have been designated with the same reference numerals in the various drawings and, further, the various drawings are not to scale. Further, only those elements which are useful to the understanding of the present disclosure have been shown and will be described. In particular, the well-known elements of a bicycle, particularly the structure of the bicycle frame and the connection between the wheels and the frame are not described in detail. In the following description, unless otherwise indicated, terms "substantially", "approximately", and "in the order of" mean "to within 10%".

It is known to provide the hub of a drive wheel of a cycle, particularly of a bicycle, a motorized bicycle, a tandem, or a tricycle, with a device capable of measuring the drive torque delivered by the cyclist to rotate the drive wheel, generally the rear wheel of the cycle, particularly to determine the driving power delivered by the cyclist.

In one of the embodiments described in document WO2011/066075, the torque meter device comprises a proof body provided with strain gauges and arranged in the rear wheel cassette. A disadvantage of this device is that it requires using a specific proof body. This results in significant modifications of an existing hub to install the meter device. Further, a housing should be provided to receive the proof body of the meter device, which increases the weight and the bulk of the rear wheel hub. This may further adversely affect the appearance of the cycle.

Thus, an object of an embodiment is to overcome all or part of the disadvantages of the previously-described cycle wheel hubs provided with torque and/or power meter devices.

Another object of an embodiment is for the device measuring the drive torque and/or the driving power of a drive wheel of a cycle to only slightly modify the structure of existing drive wheel hubs.

Another object of an embodiment is for the meter device to have a low bulk.

Another object of an embodiment is for the meter device to be easily adaptable to existing cycle wheel hubs.

Figure 2:
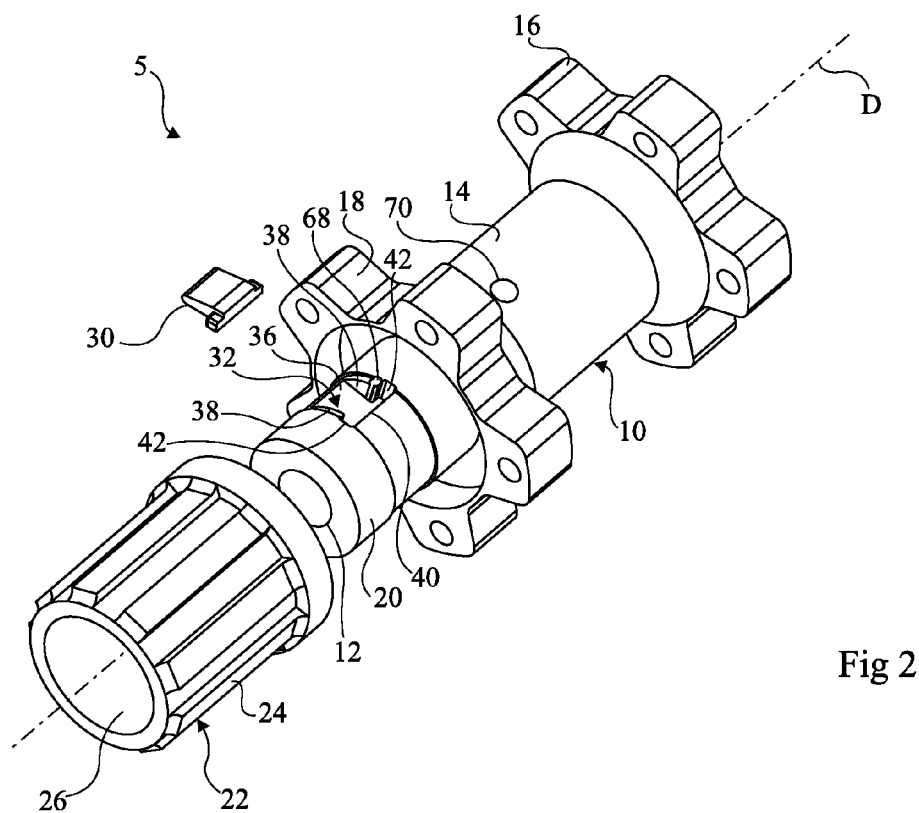
FIG. 2 is an exploded perspective view of the hub of FIG. 1.
Figure 3:
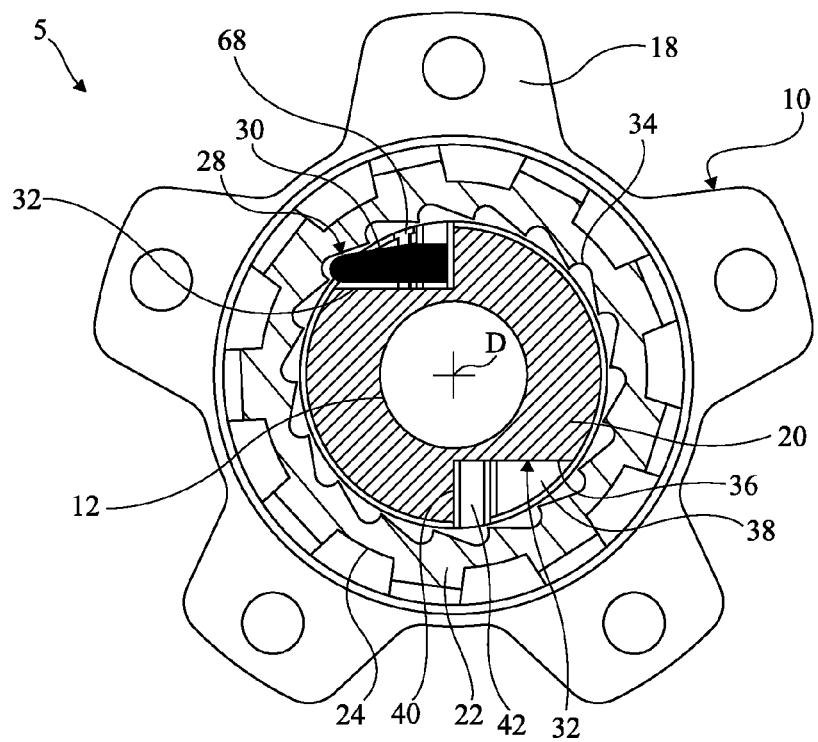
FIG. 3 is a cross-section view of FIG. 2 along line III-III.

FIGS. 1 to 3 show an embodiment of a cycle drive wheel hub 5, for example, the rear wheel of a bicycle.

Hub 5 comprises a hub shell 10 comprising a cylindrical opening 12 of axis D. Opening 12 is intended to receive a hollow shaft of axis D, not shown, attached to the bicycle frame. Hub shell 10 is assembled to freely rotate around this shaft. Hub shell 10 comprises a cylindrical median portion 14 and two lateral flanges or bulges 16 and 18 with a larger diameter than median portion 14. Flanges 16, 18 provide anchor points to the spokes, not shown, of the wheel, the spokes being further assembled on a rim.

At one of its ends, hub shell 10 comprises an end piece 20 intended to receive a freewheel body 22. Bulge 18 is located between median portion 14 and end piece 20. Freewheel body 22 comprises a cylindrical and grooved outer surface 24, which is provided to receive a cog set, not shown, also called cassette. The cog set meshes with the bicycle chain and is rotated when the cyclist actuates the bicycle crank gear. Freewheel body 22 is crossed by an opening 26 of axis D. In operation, end piece 20 is arranged in opening 26 and ball bearings, not shown, are interposed between end piece 20 and freewheel body 22.

A one-way freewheel mechanism 28 provides the connection between hub shell 10 and freewheel body 22. Freewheel mechanism 28 comprises at least one ratchet 30, generally at least two ratchets. According to the present embodiment, each ratchet 30 is arranged in a housing 32 provided in end piece 20. The internal surface of opening 26 of end piece 20 comprises teeth 34 all around the top opposite to ratchets 30. As a variation, each ratchet may be arranged in a housing provided in freewheel body 22 and the external surface of end piece 20 may comprise teeth all around the top in front of ratchets 30.

In FIG. 3, two housings 32 have been shown and only one ratchet 30 has been shown in housing 32 located at the top of the drawing, knowing that another ratchet, not shown, is mounted in operation in housing 32 located at the bottom of the drawing. As an example, each housing 32 comprises a flat bottom 36, two planar lateral walls 38, a planar back wall 40, and two recesses 42, each recess 42 being located between one of lateral walls 38 and back wall 40.

Figure 4:
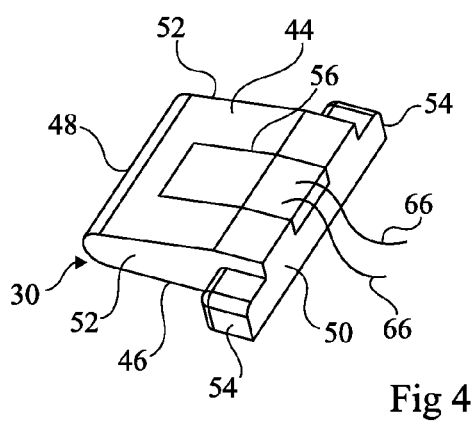
FIGS. 4 and 5 respectively are a perspective view and a cross-section view of one of the ratchets of the freewheel mechanism of the hub of FIG. 1.
Figure 5:
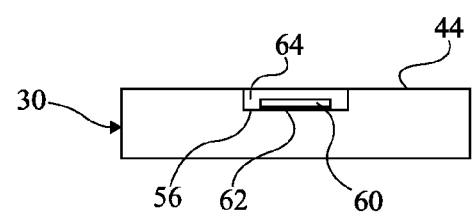

FIGS. 4 and 5 show ratchet 30 in further detail. Ratchet 30 comprises an upper wall 44, a lower wall 46, a rounded front wall 48 connecting the front edge of upper wall 44 to the front edge of lower wall 46, a planar back wall 50 connecting the back edge of upper wall 44 to the back edge of lower wall 46 and lateral walls 52 connecting the lateral edges of upper wall 44 to the lateral edges of lower wall 46. Ratchet 30 further comprises pins 54 projecting on either side of ratchet 30 from lateral walls 52.

Each ratchet 30 is pivotally assembled in housing 32 around an axis parallel to axis D extending substantially at the level of pins 54. Ratchets 30 are resiliently controlled to cooperate with teeth 34 provided on the internal surface of opening 26 of end piece 20. Each ratchet 30 is permanently maintained pressed against teeth 34 by resilient return means, not shown, for example, a spring.

As an example, the maximum thickness of ratchet 30 is approximately 3 mm, the distance between front wall 48 and back wall 50 is approximately 10 mm, and the distance between lateral walls 52 is approximately 10 mm.

Ratchets 30 enable to selectively rigidly connect bodies 10 and 22 and the cyclist exerts an effort to rotate freewheel body 22 by means of a crank gear connected to the cog set by a chain. Freewheel body 22 then rotates hub shell 10. When the cyclist no longer exerts an effort for rotating freewheel body 22, ratchets 30 do not stop the rotation of hub shell 10. The bicycle drive wheel can then rotate without for the crank gear to be rotated.

In the present embodiment, ratchet 30 comprises a recess 56 provided on upper wall 44. As an example, recess 56 has a maximum depth smaller than or equal to 0.8 mm. A strain and/or deformation sensor 60 is arranged in recess 56. As an example, sensor 60 is glued to the bottom of recess 56 by a glue layer 62, particularly a cyanoacrylate glue. The rest of recess 56 may be filled with a filling material 64, for example, an epoxy resin. Sensor 60 is connected by electric conductors 66, for example, electric wires, to a processing circuit, not shown. An opening 68, which emerges into central opening 12 of the hub shell, is provided along wall 38 of housing 32. Opening 68 enables wires 66 to pass into central opening 12. An opening 70, which emerges into central opening 12 of the hub shell, is provided in median portion 14 of hub shell 10 and enables wires to pass from central opening 12 to the outside of hub shell 10.

As a variation, several strain/deformation sensors are provided on upper wall 44 of ratchet 30. According to another variation, a strain/deformation sensor is also provided on lower wall 46 of ratchet 30 and/or on lateral walls 52. As a variation, at least one strain/deformation sensor is provided for at least two ratchets, preferably for each ratchet 30 of freewheel mechanism 28.

According to an embodiment, sensor 60 comprises a resistance strain gauge. The resistance strain gauge is capable of translating the ratchet deformation into an electric resistance variation. Preferably, the resistance strain gauge is arranged to detect a deformation of ratchet 30 along a longitudinal direction, that is, substantially perpendicular to back wall 50. As a variation, several strain gauges are arranged on wall 44 along different directions.

According to an embodiment, the sensor is partly or totally integrated to ratchet 30. It can then comprise a microelectromechanical system or MEMS.

As an example, ratchet 30 is made of a material such as an aluminum alloy or steel. These materials have a high yield point. Naturally, any other appropriate material is suitable.

Figure 6:
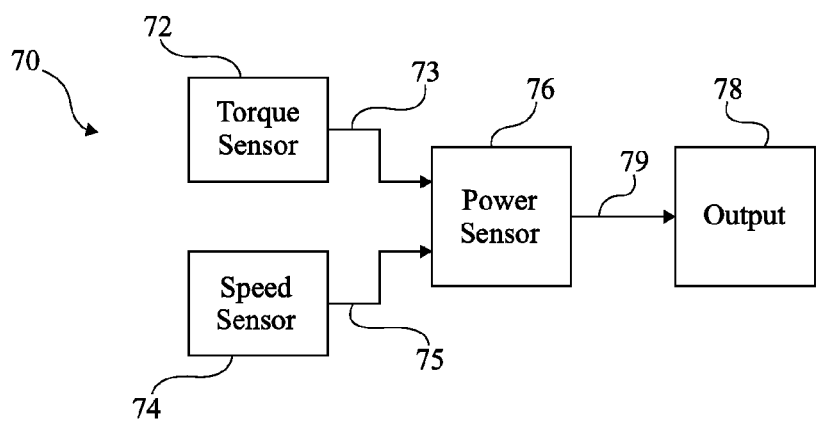
FIG. 6 shows in the form of a block diagram an embodiment of a power meter device.

FIG. 6 shows in the form of a block diagram an embodiment of a system 70 for measuring the drive power delivered by the cyclist.

System 70 comprises:
- a circuit 72 (Torque Sensor) for measuring drive torque CM delivered by the cyclist to drive the drive wheel;
- a circuit 74 (Speed Sensor) for measuring rotation speed ω of the bicycle wheels;
- a circuit 76 (Power Sensor) for determining the driving power PM delivered by the cyclist, connected to circuit 72 by a connection 73 and to circuit 74 by a connection 75; and
- a data storage and/or data display system 78 (Output) connected to circuit 76 by a connection 79.

Circuit 72 determines torque CM from force F, exerted by freewheel body 22 on ratchet 30 when freewheel body 22 rotates hub shell 10 and obtained from the measurement provided by sensor 60. Torque CM is defined by the following relation (1):

$$CM = 2 \times A \times F \times L \quad (1)$$

where L is the distance separating the point of application of force F from axis D and A is a correction factor, which may vary from 0 to 1. Factor A reflects the fact that the direction of force F measured by sensor 60 cannot be exactly perpendicular to the line perpendicular to axis D and substantially running through the point of application of force F, that is, substantially at the level of front wall 48 of ratchet 30.

Knowing drive torque CM enables to determine the driving power PM delivered by the cyclist and defined by the following relation (2):

$$PM = CM \times \omega \quad (2)$$

According to an embodiment, sensor 60 is capable of providing a signal representative of deformation ε of ratchet 30. Force F is then obtained by the following relation (3):

$$F = S \times E \times \varepsilon \quad (3)$$

where S is the cross-section of ratchet 30 at the level of sensor 60 and E is the Young's modulus of the material forming ratchet 30.

When sensor 60 comprises a resistance strain gauge, the relative variation of the resistance of strain gauge 60 is proportional, to within the gauge factor, to the relative length variation of the gauge, and thus also to the relative length variation of the ratchet portion which supports the resistance strain gauge. Advantageously, a gauge 60 having a high gauge factor is selected, to obtain a signal of greater amplitude and thus improve the sensitivity of sensor 60.

Angular velocity sensor 74 detects rotation speed ω of the rear or front wheel of the bicycle, as known in the art. As an example, angular velocity sensor 74 may be a Reed-type cell capable of measuring the angular velocity of hub 5. The Reed cell detects each turn of the hub around the shaft having the hub assembled thereon, by means of a magnet arranged in a notch made in the shaft, which provides a measurement of the angular velocity of the wheel.

System 78 may comprise a display screen and/or a data storage memory. Circuit 76 is then capable of displaying the determined driving power PM on the display screen and/or of storing in the memory the value of the determined driving power PM.

Of course, circuit 76 may determine additional data, in addition to driving power PM, based on drive torque CM and/or rotation speed w. As an example, circuit 76 may determine the bicycle speed, the distance traveled, and the travel time, as well as the average values, such as the average power, the average speed, etc.

According to another embodiment, circuits 72 and 76 are at least partly confounded.

Connection 73, connection 75, and/or connection 79 may be wire or wireless connections. As an example, the transmission of data over wireless connections implements wireless data exchange methods. It may be the method known as ANT or methods based on IEEE standard 802.15.4, particularly the communication protocol known as Zigbee, or on IEEE standard 802.15.1, particularly the communication protocol known as Bluetooth. As an example, the wire connections may comprise a rotating collector in the case where signals have to be transmitted between two mobile parts rotating with respect to each other.

Drive torque meter circuit 72, angular velocity sensor 74, driving power determination circuit 76, and system 78 may be arranged at different locations on the bicycle. As an example, torque meter circuit 72 may be located at the level of hub 5 of the rear wheel, driving power determination circuit 76 and data display system 78 may be located on the bicycle handlebar, and speed sensor 74 may be located on the cycle seat stays, to measure the rotation speed of the rear wheel, or on the cycle fork, to measure the rotation speed of the front wheel.

Figure 7:
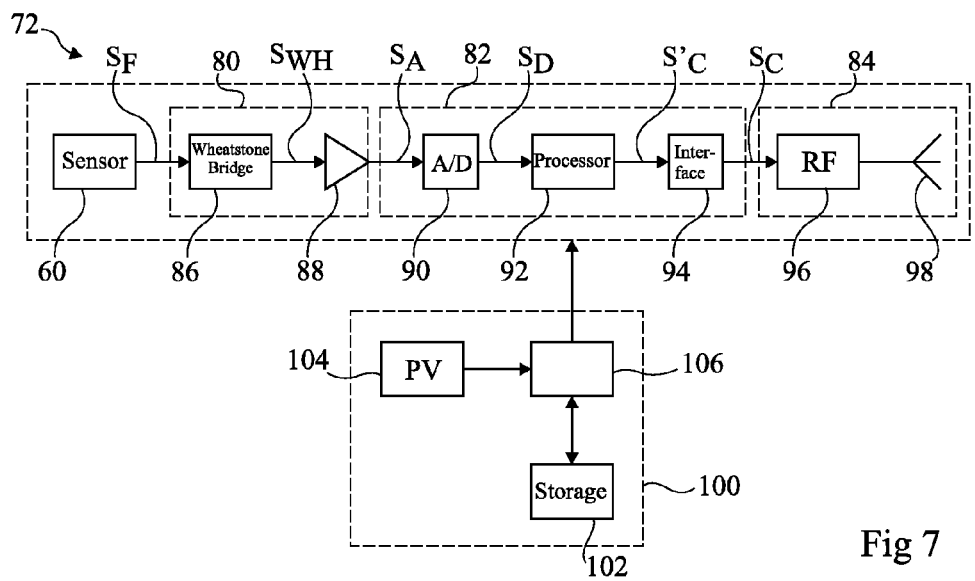
FIG. 7 shows in the form of a block diagram an embodiment of a torque meter device.

FIG. 7 partially and schematically shows an embodiment of circuit 72 for measuring drive torque CM, in the case where connection 73 is a wireless connection.

Meter circuit 72 comprises:
- sensor 60 (Sensor) which provides a signal SF;
- a circuit 80 for shaping signal SF providing an analog signal SA;
- a processing circuit 82 receiving analog signal SA and providing a signal SC representative of drive torque CM delivered by the cyclist to rotate the rear wheel; and
- a transmission circuit 84 capable of shaping signal SC for its transmission by a wireless connection.

In the case where sensor 60 is a resistance strain gauge, shaping circuit 80 comprises a Wheatstone bridge 86 connected to resistance strain gauge 60. Wheatstone bridge 86 delivers a signal SWH to an analog amplifier 88 which amplifies signal SWH measured by bridge 86. Amplifier 88 delivers analog signal SA to processing circuit 82.

According to a variation, sensor 60 is a force sensor capable of measuring the force applied by freewheel body 22 to ratchet 30 when freewheel body 22 is rotated by the cyclist. In this case, if the signal provided by sensor 60 is directly representative of the force applied to ratchet 30, Wheatstone bridge 86 may be omitted.

Processing circuit 82 comprises an analog-to-digital converter 90 (A/D) which converts analog signal SA into a digital signal SD. Processing circuit 82 further comprises a unit 92 (Processor) receiving signal SD and providing a digital signal S'C representative of drive torque CM. Processing circuit 82 for example comprises a microcontroller executing software instructions, and a memory. It may also be an electronic circuit configured to determine drive torque CM.

Processing circuit 82 further comprises a unit 94 (Interface) for shaping signal S'C to transmit it to trans-mission circuit 84. As an example, unit 94 is capable of shaping digital signal S'C for a transmission over a synchronous serial bus or SPI (Serial Peripheral Interface).

Transmission circuit 84 may comprise a radio-frequency emitter 96 (RF) connected to an antenna 98. As an example, the values of signal SC provided by processing circuit 82 may be transmitted via the RF emitter 96 to antenna 98 for a radio frequency transmission at 2.4 GHz according to the ANT wireless communication protocol.

Torque meter circuit 72 is powered by a power supply circuit 100. As an example, power supply circuit 100 comprises a power storage unit 102 (Storage), for example, a battery or a capacitor, photovoltaic panels 104 (PV), and a power management unit (Energy Unit) 106 connected to power storage unit 102 and to photovoltaic panels 104. Unit 106 is capable of delivering a substantially constant voltage to circuit 72 from the power provided by storage unit 102 and/or photovoltaic panels 104. Power management unit 106 is, further, capable of recharging storage unit 102 from the power provided by photovoltaic panels 104. Photovoltaic panels 104 are, for example, placed at the at level of the rear wheel rim and/or of the rear wheel spokes. As a variation, power supply circuit 100 may further comprise another power source, as a complement of or to replace photovoltaic panels 104. It for example is a power recovery system associated with the rear wheel.

As an example, circuits 80, 82, 84, 102, and 106 may be arranged in a package located inside or on top of median portion 14 of hub shell 10.

When circuits 72 and 76 are confounded, processing circuit 92 may further receive from angular velocity sensor 74 a signal representative of the angular velocity of the wheels and may, in addition to drive torque CM, determine driving power PM.

When the cyclist is pedaling, in a motive motion, the ratchets rigidly connect, for a rotating motion, freewheel body 22 to hub shell 10, and hub shell 10 is rotated around axis D. Ratchet 30 deforms and varies the resistance of strain gauge 60, which enables processing circuit 92 to calculate the value of drive torque CM, based on the signal provided by Wheatstone bridge 86. Ratchet 30 essentially works in compression when freewheel body 22 rotates hub shell 10.

Preferably, in the absence of a torque transmitted by the bicycle chain, sensor 60 is not strained. Only when a drive torque is transmitted is sensor 60 compressed. Advantageously, when the rear wheel is in freewheel, the elements of device 72 are adjusted to cancel the imbalance of the Wheatstone bridge in the absence of strain and to also cancel imbalances in the entire signal amplification and processing chain. As an example, processing circuit 92 automatically detects freewheel phases by studying the instantaneous variations of the torque. Indeed, during a pedaling cycle, the torque transmitted by the cyclist crosses two maximum values, corresponding to the positions where the right-hand and left-hand cranks of the crank gear substantially form a 60° angle with the vertical direction, and two minimum values, when the cranks are in low position. Processing circuit 92 is capable of detecting such repeated variations of drive torque CM. When there is no further variation, processing circuit 92 deduces that the bicycle is in freewheel mode. Processing circuit 72 can then control the adjustment of operating parameters of the elements of device 72 (variable amplification gain, variable resistances, etc.) to set the zero of device 72.

Figure 8:
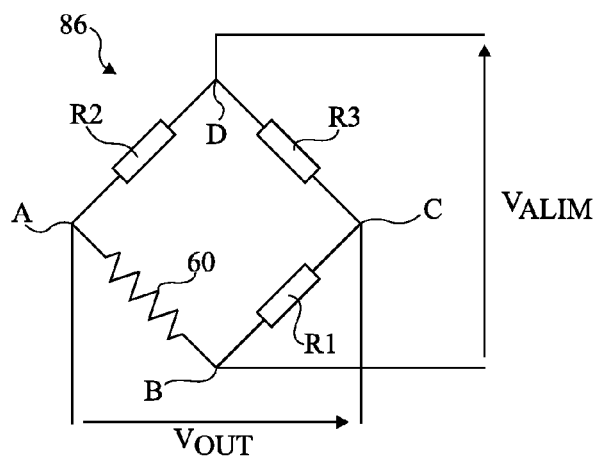
FIG. 8 partially and schematically shows an embodiment of a portion of the device of FIG. 7.

FIG. 8 shows an embodiment of Wheatstone bridge 86. Wheatstone bridge 86 comprises four nodes A, B, C, and D. Resistance strain gauge 60 is connected between nodes A and B. A fixed resistance R1, for example, 120 ohms, is connected between nodes B and C. Adjustable resistors R2 and R3 are respectively connected between nodes A and D and between nodes C and D. Signal SWH provided by the Wheatstone bridge corresponds to voltage VOUT between nodes A and C. Voltage VALIM is a constant voltage applied between nodes D and B.

As a variation, when ratchet 30 is provided with two resistance strain gauges, the additional resistance strain gauge may be connected to the Wheatstone bridge instead of resistor R2. According to another variation, when ratchet 30 is provided with four resistance strain gauges, they may be assembled as a full Wheatstone bridge. Since the gauges are attached to the same ratchet, this makes the signal delivered by the gauges insensitive to temperature variations, since the Wheatstone bridge is thus self-compensated.

To limit the electric power consumption, it is preferable to power resistance strain gauge 60 in pulses, by only powering it for a few tens of microseconds at a sampling frequency greater than 40 Hz.

Torque meter device 70 has the advantage of being relatively compact and light and efficiently measures drive torque CM of the wheel.

Figure 9:
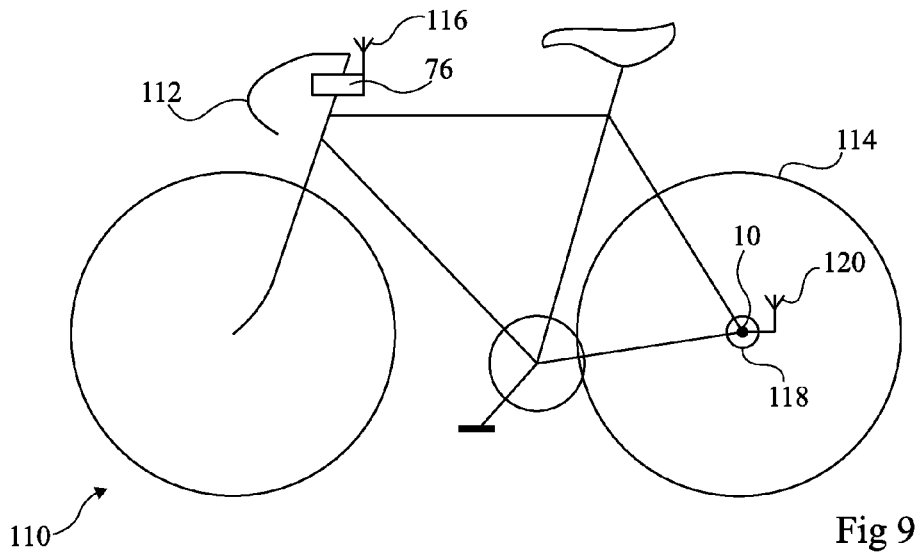
FIG. 9 partially and schematically shows a motorized bicycle equipped with a power management system of the type described in relation with FIG. 6.

FIG. 9 schematically shows a bicycle 110 provided with a power meter device of the type described in relation with FIG. 6. In this example, circuit 76 of determination of driving power PM and display and/or storage system 78 are arranged at the level of handlebar 112. They are for example integrated to a speedometer display. Circuit 74 of determination of drive torque CM is arranged at the level of hub 10 of rear wheel 114 of bicycle 110. A wireless communication antenna 116 of circuit 78 has been schematically shown.

According to an embodiment, bicycle 110 further comprises, on the side of its rear wheel 114, a pedal-assist motor 118, for example, an electric motor. In this embodiment, the power meter device may be used to optimize the use of the assist motor. An antenna 120 provided on the side of motor 118 may enable to create a communication between the motor and circuit 76 of the power meter device. The measurement of the power delivered by the cyclist may be used to control speed variations of motor 118, increasing when the power provided by the cyclist decreases, and decreasing when the power provided by the cyclist increases.

Specific embodiments have been described. It should be noted that those skilled in the art may combine various elements of these various embodiments and variations without showing any inventive step.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A device for measuring the drive torque and/or the driving power delivered on a hub shell by a freewheel body connected to the hub shell by a freewheel mechanism, the device comprising at least one deformation and/or strain sensor on, or integrated to, at least one ratchet of said mechanism and a first drive torque and/or driving power determination circuit, connected to the sensor, and a second drive torque and/or driving power determination circuit separate from the first circuit.

2. The device of claim 1, wherein the sensor comprises at least one resistance strain gauge on said ratchet.

3. The device of claim 1, wherein at least two deformation and/or strain sensors are arranged on, or integrated to, said ratchet.

4. The device of claim 1, wherein the sensor comprises at least one microelectromechanical system integrated to the ratchet.

5. The device of claim 1, wherein the mechanism comprises a plurality of ratchets, the device comprising at least one deformation and/or strain sensor on, or integrated to, each ratchet.

6. The device of claim 1, further comprising a system of electric power supply of said circuit and/or said sensor, said system of electric power supply comprising at least a solar panel and a power storage device.

7. The device of claim 1, further comprising a sensor for determining the angular velocity of the hub shell.

8. The device of claim 1, wherein the first circuit transmits data to the second circuit over a wireless connection.

9. The device of claim 1, wherein the sensor is located in a recess provides at the surface of the ratchet.

10. A cycle hub comprising a freewheel body, a hub shell, a freewheel mechanism with ratchets, and a device for measuring the drive torque and/or the driving power delivered on the hub shell by the freewheel body, the device comprising at least one deformation and/or strain sensor on, or integrated to, at least one ratchet of said mechanism and a first drive torque and/or driving power determination circuit, connected to the sensor, wherein the sensor located in a recess provided at the surface of the ratchet.

11. The cycle hub of claim 10, having a second drive torque and/or driving power determination circuit separate from the first circuit.

12. A bicycle with a cycle hub comprising a freewheel body, a hub shell, a freewheel mechanism with ratchets, the bicycle being provided with a device for measuring the drive torque and/or the driving power delivered on the hub shell by the freewheel body connected to the hub shell by the freewheel mechanism, the device comprising at least one deformation and/or strain sensor on, or integrated to, at least one ratchet of said mechanism and a first drive torque and/or driving power determination circuit, connected to the sensor, and a second drive torque and/or driving power determination circuit separate from the first circuit.

13. The bicycle of claim 12, wherein the sensor is located in a recess provided at the surface of the ratchet.

\* \* \* \* \*